(12) United States Patent
Nakamura et al.

(10) Patent No.: US 6,870,266 B2
(45) Date of Patent: Mar. 22, 2005

(54) OXIDE SEMICONDUCTOR ELECTRODE AND PROCESS FOR PRODUCING THE SAME

(75) Inventors: Masateru Nakamura, Susono (JP); Midori Mori, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/642,281

(22) Filed: Aug. 18, 2003

(65) Prior Publication Data

US 2004/0061109 A1 Apr. 1, 2004

(30) Foreign Application Priority Data

Aug. 23, 2002 (JP) ........................................ 2002-243857

(51) Int. Cl.⁷ .............................................. H01L 29/40
(52) U.S. Cl. ........................ 257/770; 257/775; 257/178; 257/79
(58) Field of Search ......................... 257/79, 178, 764, 257/770, 775, E39.006, E23.005, E23.019

(56) References Cited

U.S. PATENT DOCUMENTS

| | | | | |
|---|---|---|---|---|
| 5,501,744 A | * | 3/1996 | Albright et al. | ............ 136/258 |
| 6,580,026 B1 | * | 6/2003 | Koyanagi et al. | ............ 136/263 |
| 6,664,462 B2 | * | 12/2003 | Arakawa et al. | ............ 136/263 |
| 6,683,244 B2 | * | 1/2004 | Fujimori et al. | ............ 136/263 |
| 6,720,202 B2 | * | 4/2004 | Wang | ........................... 438/85 |
| 6,730,934 B2 | * | 5/2004 | Yamada et al. | ............... 257/79 |
| 2003/0150485 A1 | * | 8/2003 | Koyanagi et al. | ............ 136/256 |

FOREIGN PATENT DOCUMENTS

| JP | 55-140138 | * 11/1980 | .......... G01N/27/12 |
|---|---|---|---|
| JP | A 1-220380 | 9/1989 | |
| JP | 5-126777 | * 5/1993 | ................ 73/31.06 |
| JP | A 9-259943 | 10/1997 | |
| JP | 11-220158 | * 8/1999 | ............ H01I/31/10 |
| JP | 2001-196104 A | * 7/2001 | ........... H01L/31/04 |

* cited by examiner

Primary Examiner—Jasmine Clark
(74) Attorney, Agent, or Firm—Oliff & Berridge, PLC

(57) ABSTRACT

The present invention provides an oxide semiconductor electrode which can realize a combination of high transparency with large surface area and is highly responsive to ultraviolet light, as well as to visible light. The oxide semiconductor electrode comprises a conductive substrate and an oxide semiconductor layer provided on the conductive substrate. The oxide semiconductor layer is a porous layer comprising porous titania particles which have been joined to each other to define interparticulate communicating pores. Preferably, the pores possessed by the titania particles per se have a diameter of 10 to 40 nm, the interparticulate communicating pores have a diameter of 10 to 70 nm, and the titania particles have an average diameter of 10 to 70 nm.

11 Claims, 7 Drawing Sheets

Conventional Art

OXIDE SEMICONDUCTOR ELECTRODE AND PROCESS FOR PRODUCING THE SAME

BACKGROUND OF THE INVENTION

1. Field of the Invention

The present invention relates to an oxide semiconductor electrode for a dye sensitized solar cell and a process for producing the same.

2. Description of the Related Art

Solar cells utilizing sunlight have drawn attention as an energy source that is cleaner than energy sources which rely upon fossil fuels. Among others, solar cells utilizing pn junction of semiconductor silicon are well known and have been put to practical use. Silicon solar cells, however, require large energy in the production thereof, particularly in the purification of silicon as a raw material. Therefore, silicon solar cells involve problems including that a reduction in price is difficult and the power generation cost is high.

On the other hand, constructing an electrochemical solar cell using a dye has been proposed in Japanese Unexamined Patent Publication (Kokai) No. 1-220380. Solar cells of this type are generally called "dye sensitized solar cells," and the construction thereof is shown in FIG. 1. As shown in FIG. 1, a dye sensitized solar cell 1 comprises an oxide semiconductor electrode 2, a counter electrode 3 provided opposite to the oxide semiconductor electrode 2, and an electrolyte layer 4 interposed between the oxide semiconductor electrode 2 and the counter electrode 3. The oxide semiconductor electrode 2 comprises a glass substrate 5, a transparent conductive layer 6 provided on the glass substrate 5, and an oxide semiconductor layer 7 provided on the transparent conductive layer 6. On the other hand, the counter electrode 3 comprises a glass substrate 8 and a transparent conductive layer 9 provided on the glass substrate 8. The electrolyte 4 comprises couples of iodine ions ($I^-/I_3^-$) with a plurality of different oxidation states.

FIG. 2 is a partially enlarged view of the dye sensitized solar cell 1 shown in FIG. 1. As shown in FIG. 2, the oxide semiconductor layer 7 comprises a plurality of titania ($TiO_2$) particles 10 which have been joined to each other. A dye 11 of a ruthenium complex is chemically adsorbed on the titania particles 10.

Upon the entry of light through the glass substrate 8, at the boundary of the titania particles 10 in the oxide semiconductor layer 7, the dye 11, and the electrolyte layer 4, three iodide ions ($I^-$) in the electrolyte give off two electrons and consequently are oxidized to iodide ions ($I_3^-$). That is, the electrolyte functions as an oxidation-reduction agent. Due to a potential gradient, the electrons arrive at the transparent conductive layer 6 and further reach the counter electrode 3. On the other hand, iodide ions ($I_3^-$), which have been brought to a higher oxidation state, travel through the electrolyte layer 4 and arrive at the transparent conductive layer 9 in the counter electrode 3. Here the iodide ions ($I_3^-$) receive two electrons and consequently are reduced to iodide ions ($I^-$) in a lower oxidation state, which again travel to the boundary of the titania particles 10, the dye 11, and the electrolyte layer 4. The repetition of the above process causes solar energy to be converted to electric energy, and a current flows.

Thus, in the dye sensitized solar cell, as electrons are smoothly given and received through an electrolyte, the oxide semiconductor layer is generally made porous. The oxide semiconductor layer has hitherto been formed by providing a glass substrate with a transparent conductive layer formed thereon, coating a slurry or paste of a fine powder of an oxide semiconductor, such as titania, onto the transparent conductive layer provided on the glass substrate, and baking the coating. In this case, however, as the baking temperature is high and is 400 to 700° C., this method cannot be applied to a resin or other substrate and glass is used as the substrate. Therefore, although the realization of a flexible solar cell has been advocated from theoretical viewpoint, a flexible solar cell has not been realized yet.

As described above, the oxide semiconductor layer is porous. In order to increase dye adsorption, the oxide semiconductor layer is formed of oxide semiconductor particles having a very small diameter. Therefore, light, in the visible to near-infrared regions involved in photoelectric conversion, is disadvantageously transmitted without satisfactory absorption in the oxide semiconductor layer, and satisfactory power generation efficiency cannot be provided.

Further, voids within the oxide semiconductor layer are so small that, in the conventional method wherein the oxide semiconductor layer is dipped in a dye solution, much time is necessary for the adsorption of the dye and, further, it is difficult to diffuse and adsorb the dye in a region within the oxide semiconductor layer.

SUMMARY OF THE INVENTION

An object of the present invention is to provide an oxide semiconductor electrode for a dye sensitized solar cell, which can realize a combination of high transparency with large surface area and is highly responsive to an ultraviolet region, as well as to a visible region, and, at the same time, can realize the use of a transparent film of an organic resin as a substrate and is flexible.

In order to attain the above object, according to the first invention, there is provided an oxide semiconductor electrode comprising: a conductive substrate; and an oxide semiconductor layer provided on said conductive substrate, said oxide semiconductor layer being a porous layer comprising a plurality of porous titania particles which have been joined to each other to define interparticulate communicating pores.

According to the second invention, in the first invention, the pores, possessed by the titania particles, per se have a diameter of 10 to 40 nm.

According to the third invention, in the first invention, said interparticulate communicating pores have a diameter of 10 to 70 nm.

According to the fourth invention, in the first invention, said titania particles have an average diameter of 10 to 70 nm.

According to the fifth invention, in the first invention, said joined titania particles bear on their surface visible region sensitizing dye molecules.

According to the sixth invention, in the fifth invention, said visible region sensitizing dye molecules are molecules of a ruthenium oxide complex.

According to the seventh invention, in the first invention, said conductive substrate is formed of a flexible material.

According to the eighth invention, in the seventh invention, said flexible material is a light transparent resin film.

According to the ninth invention, in the first invention, said oxide semiconductor layer has a thickness of 10 to 70 $\mu$m.

According to the tenth invention, there is provided a process for producing the oxide semiconductor electrode as defined in the fifth invention, said process comprising the steps of: adding visible region sensitizing dye molecules to a solution of a titanium alkoxide; coating the solution with said visible region sensitizing dye molecules added thereto onto a conductive substrate; and allowing a gelling reaction to proceed in the coating to form an oxide semiconductor layer.

According to the eleventh invention, there is provided a process for producing the oxide semiconductor electrode as defined in the first invention, said process comprising the steps of: coating a solution of a titanium alkoxide onto a conductive substrate; and applying ultraviolet light, ultrasonic waves in a liquid, or a high frequency to the coating before drying of the coating to allow a gelling reaction to proceed in the coating, thereby forming an oxide semiconductor layer.

DESCRIPTION OF THE PREFERRED EMBODIMENTS

Figure 1:
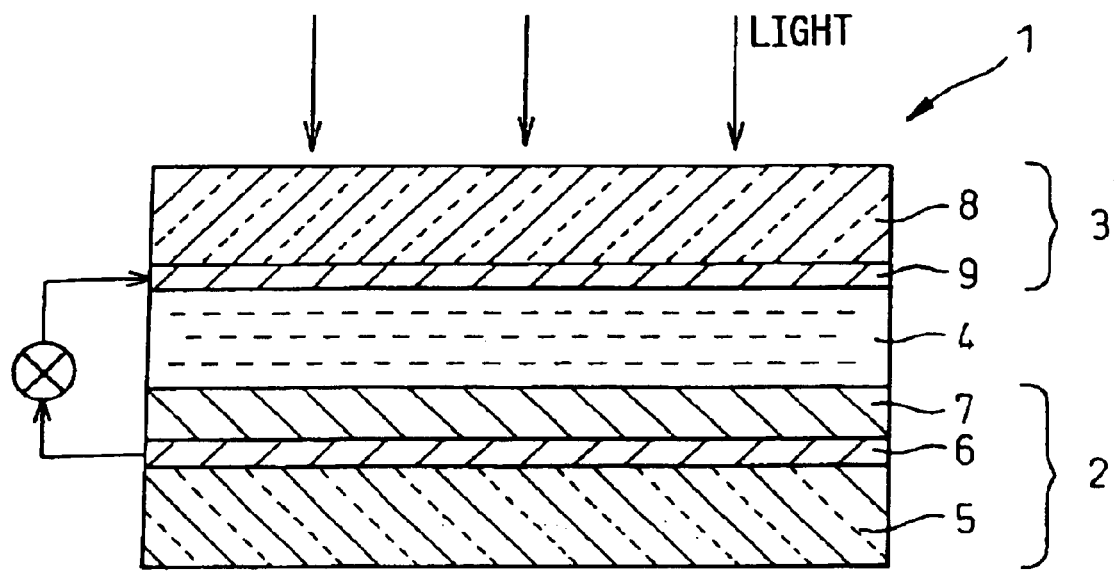
FIG. 1 is a cross-sectional view showing the construction of a conventional dye sensitized solar cell.
Figure 2:
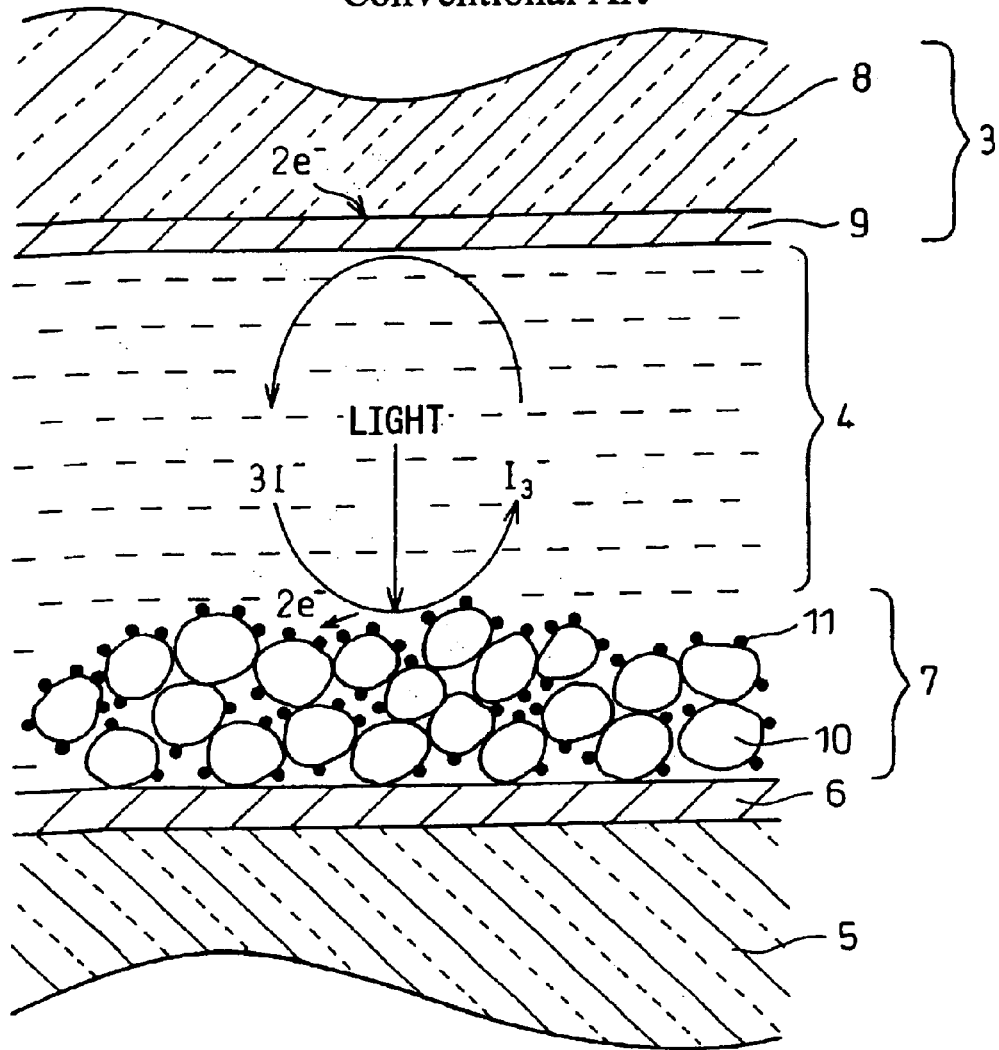
FIG. 2 is a partially enlarged cross-sectional view of the dye sensitized solar cell shown in FIG. 1.
Figure 3:
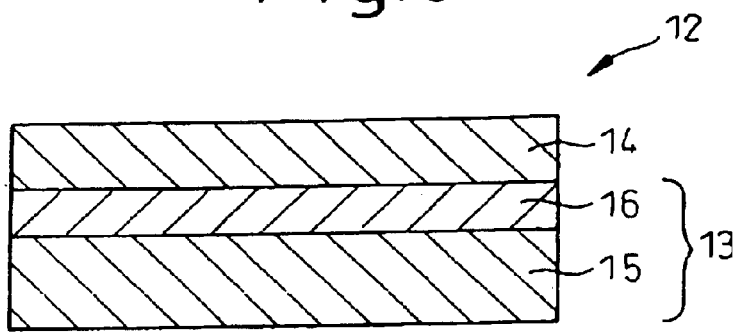
FIG. 3 is a cross-sectional view showing the construction of an oxide semiconductor electrode according to the present invention.

The present invention will be described in more detail with reference to the accompanying drawings. FIG. 3 is a cross-sectional view of an embodiment of the oxide semiconductor electrode according to the present invention. As shown in FIG. 3, an oxide semiconductor electrode 12 includes a conductive substrate 13 and an oxide semiconductor layer 14 provided on the conductive substrate 13. The conductive substrate 13 includes a substrate 15 and a conductive layer 16 provided on the substrate 15.

Any material may be used without particular limitation for constituting the substrate 15 in the conductive substrate 13. Examples of materials usable herein include materials for transparent substrates used in silicon solar cells, liquid crystal panels and the like, for example, transparent glass, semi-transparent glass, and light transparent resins, specifically PET and polycarbonate. The conductive layer 16 may also be formed of any material without particular limitation, and examples of materials usable herein include materials for transparent electrodes used in silicon solar cells, liquid crystal panels and the like, for example, antimony-doped tin oxide, fluorine-doped tin oxide, and tin-doped indium oxide. The thickness of the conductive substrate 13 is not particularly limited. In general, however, the thickness of the conductive substrate 13 is approximately less than a micron to several $\mu$m. When the substrate 15 is formed of a resin, the oxide semiconductor electrode is flexible. The conductive layer 16 may be formed on the substrate 15 by coating a component for constituting the conductive layer 16 onto the substrate 15 by, for example, vacuum deposition, sputtering, or CVD.

Figure 4:
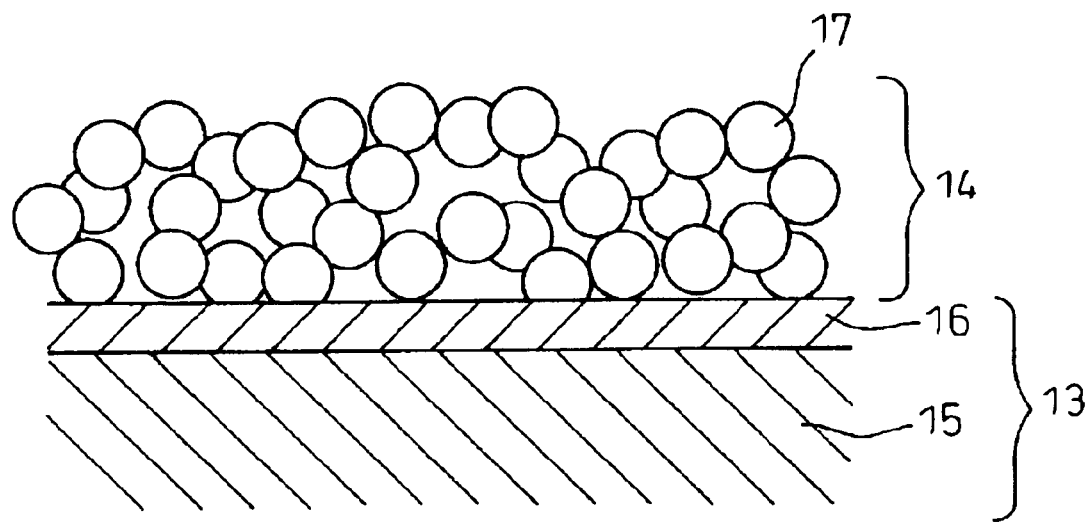
FIG. 4 is a partially enlarged cross-sectional view of the oxide semiconductor electrode shown in FIG. 3.

The structure of the oxide semiconductor layer 14 is shown in FIG. 4. FIG. 4 is a partially enlarged view of the oxide semiconductor electrode shown in FIG. 3. The oxide semiconductor layer 14 is formed on the conductive layer 16 provided on the substrate 15. The oxide semiconductor layer 14 is formed of a plurality of titania particles 17 which have been joined to each other.

Figure 5:
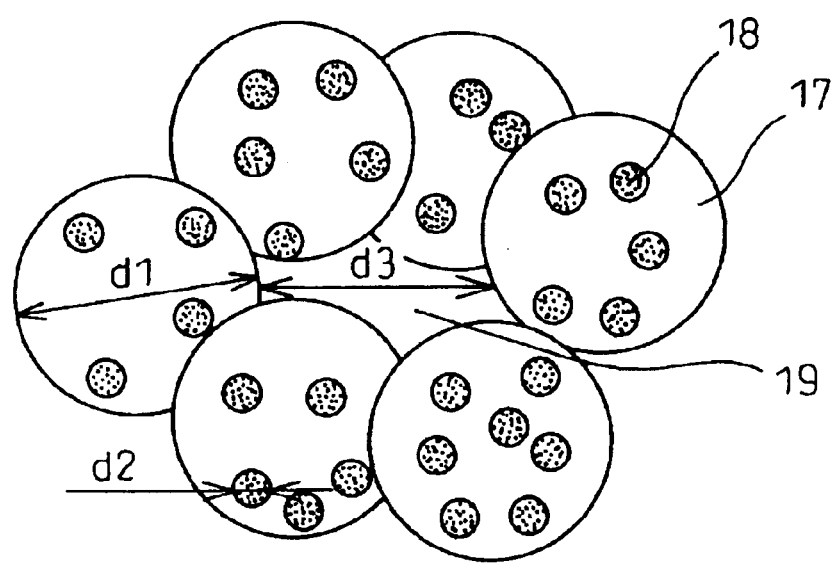
FIG. 5 is an enlarged typical view of titania particles shown in FIG. 4.
Figure 6:
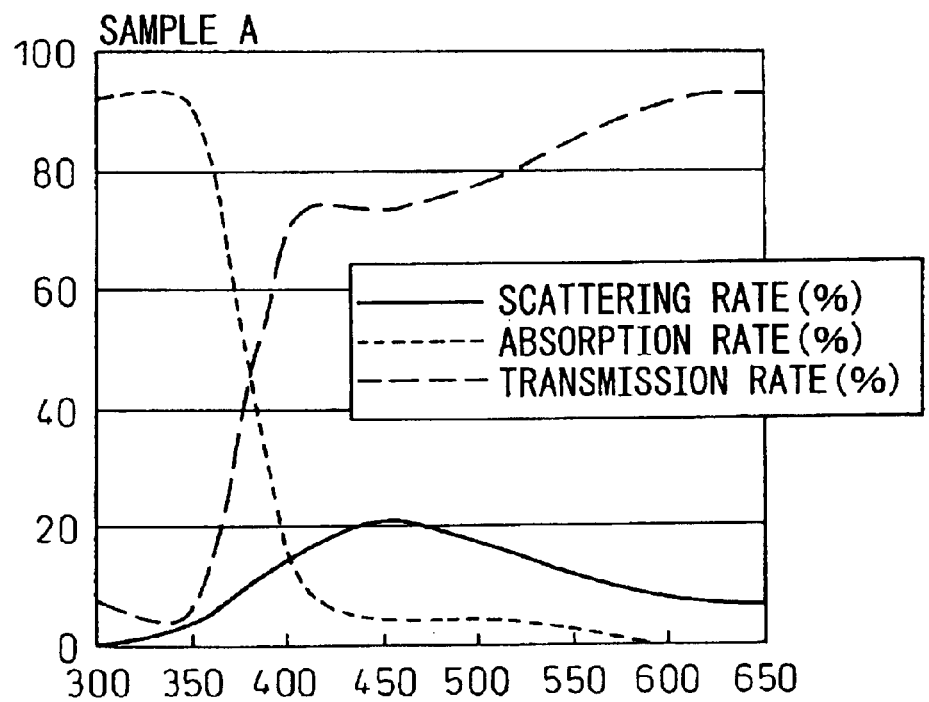
FIG. 6 is a graph showing the results of measurement of scattering rate, absorbance, and transmittance for sample A.
Figure 7:
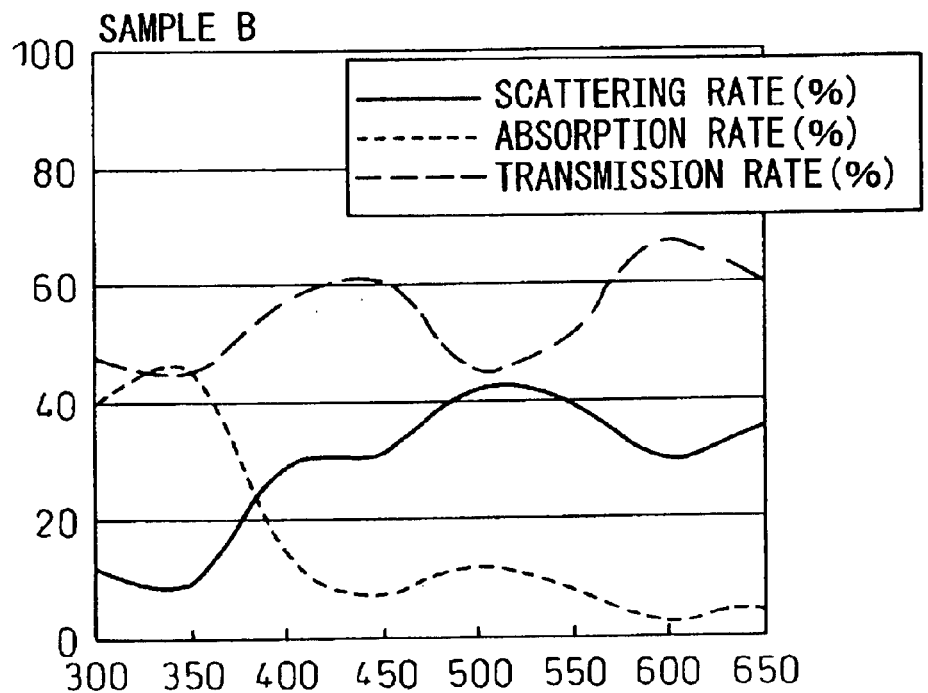
FIG. 7 is a graph showing the results of measurement of scattering rate, absorbance, and transmittance for sample B.
Figure 8:
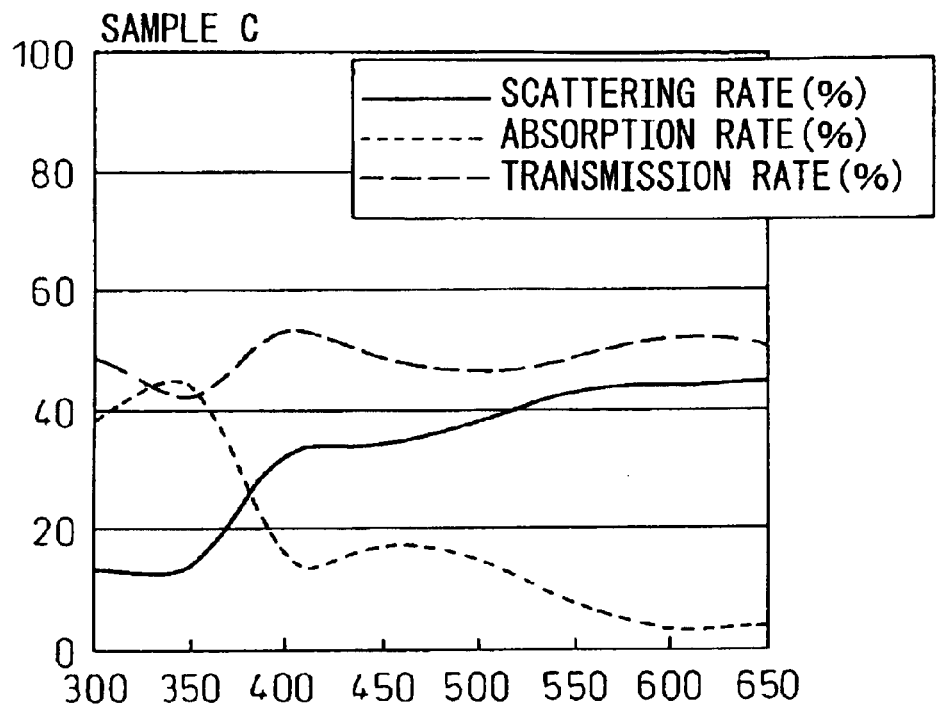
FIG. 8 is a graph showing the results of measurement of scattering rate, absorbance, and transmittance for sample C.
Figure 9:
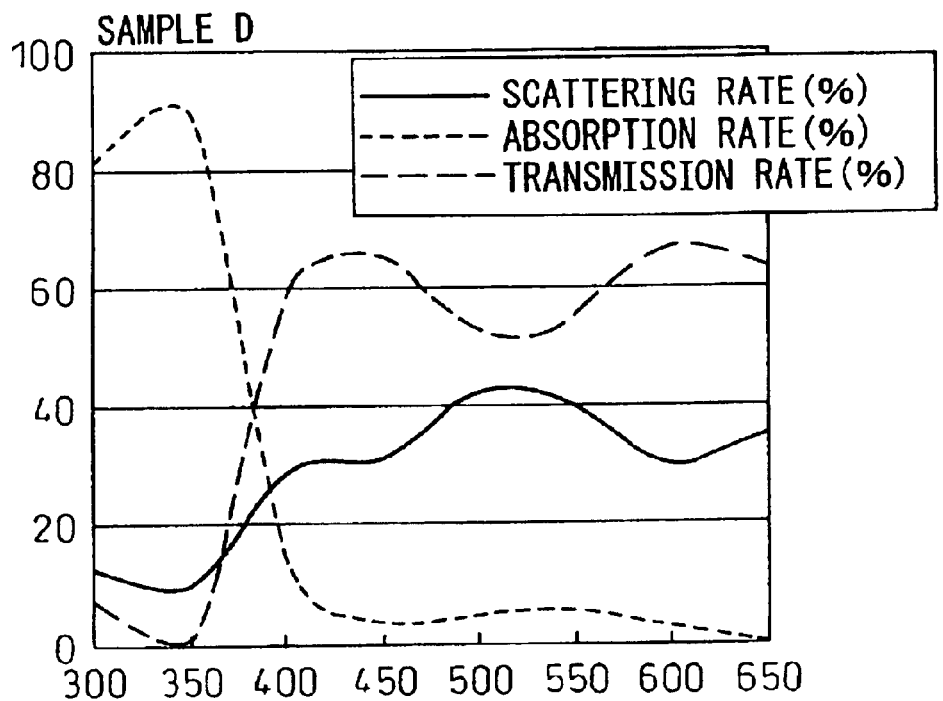
FIG. 9 is a graph showing the results of measurement of scattering rate, absorbance, and transmittance for sample D.
Figure 10:
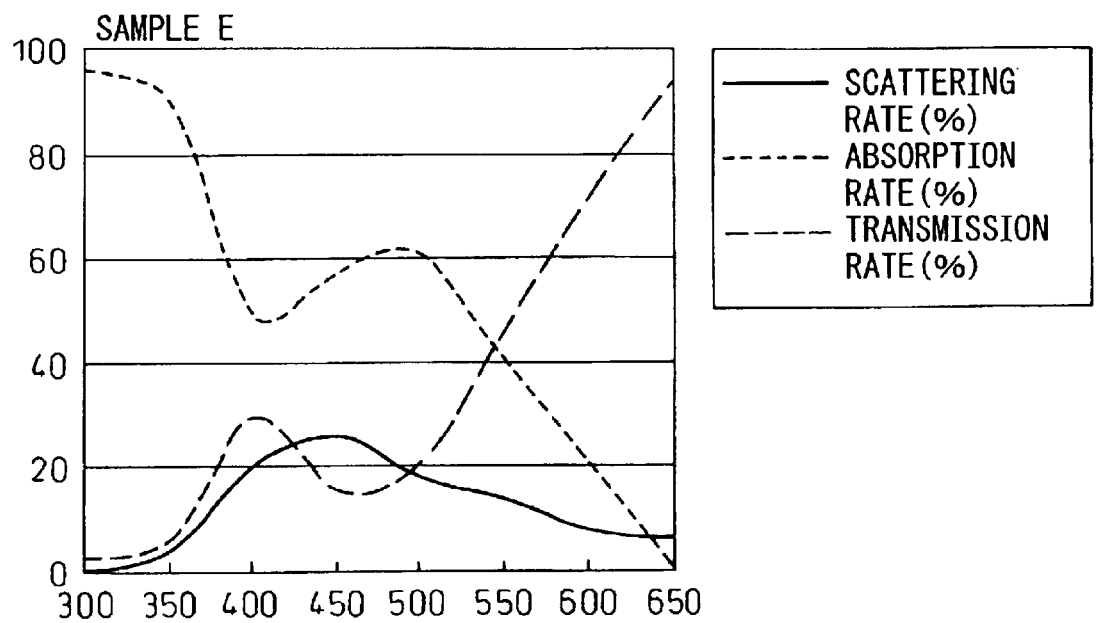
FIG. 10 is a graph showing the results of measurement of scattering rate, absorbance, and transmittance for sample E.
Figure 11:
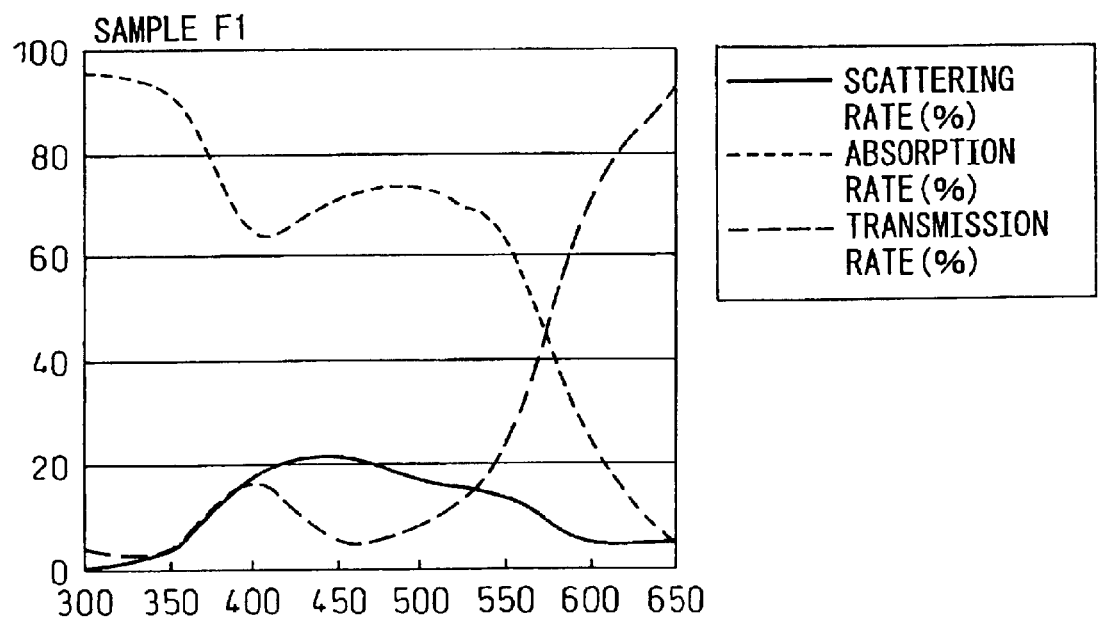
FIG. 11 is a graph showing the results of measurement of scattering rate, absorbance, and transmittance for sample F1.
Figure 12:
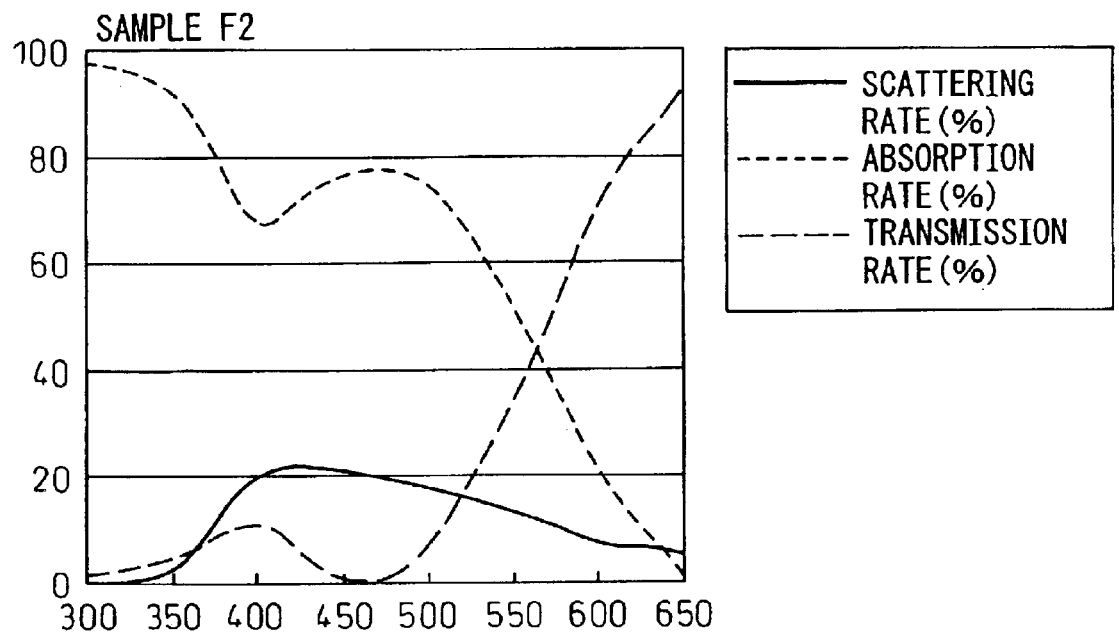
FIG. 12 is a graph showing the results of measurement of scattering rate, absorbance, and transmittance for sample F2.
Figure 13:
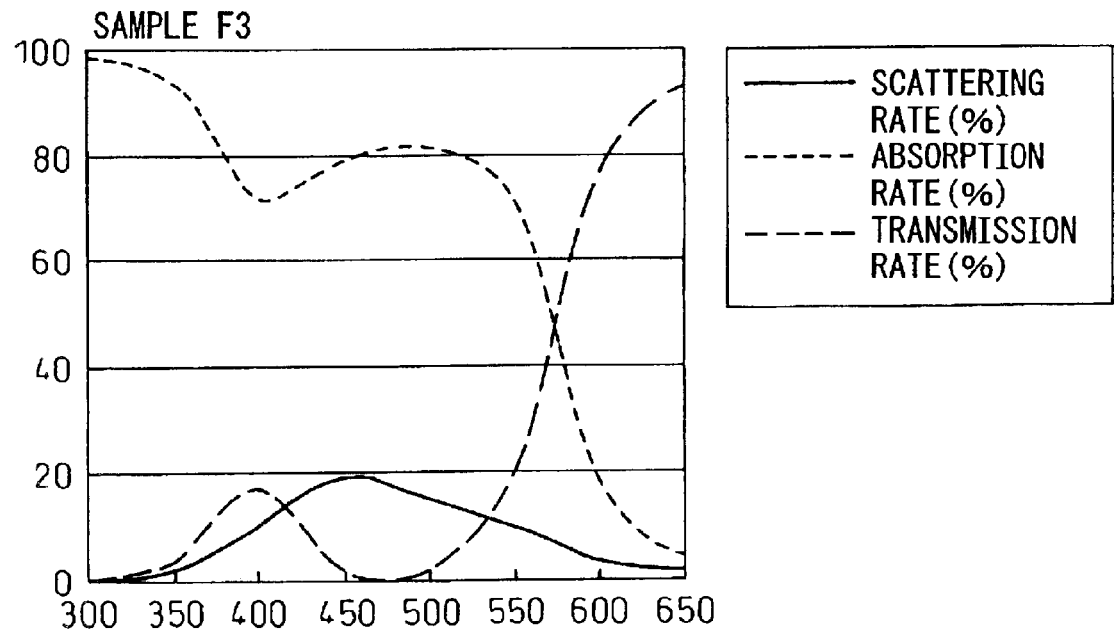
FIG. 13 is a graph showing the results of measurement of scattering rate, absorbance, and transmittance for sample F3.

FIG. 5 is a partially enlarged view of the oxide semiconductor layer 14 formed of the titania particles 17 joined to each other or one another shown in FIG. 4. As shown in the drawing, the titania particles per se have pores 18, and a plurality of the titania particles have been joined to each other to define interparticulate communicating pores 19.

The following three functions are required of the oxide semiconductor layer in the oxide semiconductor electrode.

(1) The reflection of incident light in a direction outside the layer is small.

(2) The area of contact with the electrolyte is large.

(3) The transfer of electron mediation molecules in the electrolyte is easy.

When the above items (2) and (3) are taken into consideration, it is self-evident that a porous structure should be adopted in the oxide semiconductor layer. In order to satisfy the requirement (1), however, the spacing d between non-continuous parts (solid-liquid interface part), which induces the refraction of light, should be less than the wavelength of the incident light. Light scattering and scattering ability S are classified in conjunction with incident light wavelength $\lambda$ and spacing d between non-continuous part into the following three forms.

(i) $d \gg \lambda$: geometrical optical scattering, $S \propto 1/d$ (ii) $d \sim \lambda$: Mie scattering, $S \propto d^4$ (iii) $d \ll \lambda (d \approx (1/10) \cdot \lambda)$: Rayleigh scattering, $S \propto d^6/\lambda^4$ Accordingly, in order to satisfy all the requirements (1) to (3), preferred forms of scattering are forms (ii) and (iii). In particular, in the Rayleigh scattering of form (iii), the effect is particularly large because the scattering can be reduced in proportion to the sixth power of d.

In the present invention, the wavelength of incident light, in which titania contributes to power generation, is not more than 400 nm. Therefore, it is apparent that $d \leq \approx 40$ nm is preferred in the structure of the oxide semiconductor layer. In the present invention, the microstructure of the titania particles constituting the oxide semiconductor layer is controlled, and the grain boundary part among primary particles of titania is removed to reduce scattering at the grain boundary part. Further, the formation of interparticulate communicating pores by joining particles to each other can realize the entry of a larger quantity of light in the oxide semiconductor layer and facilitates the transfer of electron mediation particles (for example, several nm in the case of an imidazolium salt) in the electrolyte.

As shown in FIG. 4, d values are specifically divided into three values, i.e., diameter d1 of primary particles of titania, pore diameter d2 of titania particles per se, and diameter d3 of interparticulate communicating pores. Regulating these values in respective predetermined ranges can provide a microstructure of titania particles which can offer the above effect. Specifically, in order to effectively reduce scattering, preferably, d1 is 10 to 40 nm, d2 is 10 to 40 nm, and d3 is 10 to 70 nm. As the lower limits of these d values are smaller than the effective diameter of the electron mediation molecules, the electron mediation molecules can be present in all solid-liquid interface parts. This can contribute to improved power generation efficiency. The thickness of the oxide semiconductor layer 14 is preferably 10 to 70 $\mu$m.

When the oxide semiconductor electrode according to the present invention is used in a dye sensitized solar cell, visible light sensitizing dye molecules are borne on the titania particles. In the present invention, dye particles can be densely arranged around titania and electrons excited by visible light rapidly and efficiently flow into titania side. Therefore, cell efficiency can be improved. Visible light sensitizing dye molecules are not particularly limited so far as they have absorption in a visible light region. Examples of such dye molecules include molecules of metal complexes and organic dyes. Metal complexes include metal phthalocyanines such as copper phthalocyanine and titanylphthalocyanine, chlorophyll or its derivatives, hemin, and complexes of ruthenium, osmium, iron and zinc, for example, cis-dicyanate-bis(2,2'-bipyridyl-4,4'-dicarboxylate)ruthenium(II). Organic dyes include metal-free phthalocyanine, cyanine dyes, metallocyanine dyes, xanthene dyes, and triphenylmethane dyes.

In the present invention, the oxide semiconductor layer is formed by the so-called "sol-gel process." Specifically, an alcohol and water are added to an alkoxide of titanium, and, if necessary, an additive such as acetylacetone is added to prepare a solution. This solution is coated onto a conductive substrate, and a gelling reaction as a result of a hydrolysis reaction of the alkoxide is allowed to proceed to form a coating layer.

Alkoxides of titanium usable herein include $Ti(OCH_3)_4$, $Ti(OC_2H_5)_4$, $Ti(iso-OC_3H_7)_4$, and $Ti(OC_4H_9)_4$. Alcohols usable herein include methanol, ethanol, and 2-methoxyethanol. The solution may be coated onto the substrate, for example, by dip coating, spin coating, or spray coating.

When the gelling reaction is allowed to proceed after coating of the solution onto the substrate, the alkoxide of titanium is hydrolyzed to form a $TiO_2$ polymer having a network structure comprising ≡Ti—O— bonds. The diameter of pores per se may be regulated by varying the type of a pore forming agent (for example, 2-methoxyethanol) added to the coating liquid, conditions for dehydropolycondensation, and conditions for baking.

As described above, after the solution of the alkoxide of titanium is coated onto the substrate, the titania sol is partially dehydropolycondensed. Upon a reaction with moisture in the air and the volatilization of the solvent, the polycondensation of the Ti—O bond is allowed to proceed and is completed to form an amorphous titania gel structure. The application of ultraviolet light during the period between the coating of the solution and the completion of the polycondensation causes light energy to act on the Ti—O bond. As a result, the polycondensation is accelerated, and, in addition, titanium and oxygen atoms take an arrangement close to a structure after crystallization. According to this process, unlike the conventional process in which heating at a temperature of 400° C. or above is necessary for the development of an anatase phase, the application of ultraviolet light can significantly lower the crystallization temperature and, consequently, heating to a temperature of 200 to 250° C. can provide the anatase phase. Further, the low baking temperature can suppress the densification of titania particles and thus can contribute to improved surface area. Further, this function can realize the formation of a porous titania layer on a light transparent resin substrate having low heat-resistant temperature which has been unattainable by the prior art technique.

Further, the same effect, as attained by ultraviolet irradiation, can be attained by the application of ultrasonic waves. In this case, a liquid is necessary as an ultrasonic wave transfer medium. Therefore, the hydrolysis and the dehydropolycondensation are carried out in either water or a mixed solution composed of water and an organic solvent. The application of ultrasonic waves can regulate the hydrolysis rate and the dehydropolycondensation rate. This makes it easy to control micropores in the titania particles per se.

Further, the application of high-frequency wave causes induction heating. As, however, there is a difference in permittivity and dielectric loss between titania and the material for the substrate, in a certain frequency band, only the titania layer is selectively heated. As a result, unlike the conventional heating method, an anatase phase can be provided without inducing any change in properties of the substrate. Preferably, frequencies in a region excluding the range of 10 to $10^2$ MHz, which causes induction heating in many resins, may be used.

The dye may be adsorbed on the oxide semiconductor layer by a conventional method in which the oxide semiconductor layer is dipped in a dye-containing solution. Preferably, however, a method is adopted wherein a dye is added to a solution of an alkoxide of titanium to prepare a dye-containing solution which is then used to form an oxide semiconductor layer. This method is advantageous in that dye molecules can be dispersed on a molecular level in a three-dimensional network structure of —Ti—O— and, after the crystallization of titania, dye molecules can be densely arranged on the surface of the titania particles. The concentration of the dye in the solution is preferably 3 to 5% by weight.

The following examples further illustrate the present invention.

EXAMPLES

Example 1

Tetraethoxytitanium ($Ti(OC_2H_5)_4$) (1 mol) was added to 750 mL of 2-methoxyethanol. The mixture was stirred for 0.5 hr. 2-Methoxyethanol (100 mL) and 0.01 mol of acetylacetone were added thereto, and the mixture was stirred for one hr. Further, 150 mL of 2-methoxyethanol and 3 mol of water were added thereto, and the mixture was stirred for 0.5 hr to prepare a coating liquid. The coating liquid was coated by dipping onto a quartz glass substrate (20×50×0.5 mm), and the coating was dried. The dried coating was heat treated at 400° C. for 0.5 hr to prepare sample A. The thickness of the layer in sample A was about 4 $\mu$m.

Comparative Example 1

A commercially available titania paste (nominal average particle diameter 200 nm) was coated by dipping onto a quartz glass substrate (20×50×0.5 mm). The coating was heat treated at 700° C. for 1.0 hr to prepare sample B. The thickness of the layer in sample B was about 4 μm.

Comparative Example 2

A commercially available titania paste (nominal average particle diameter 200 nm) was coated by dipping onto a quartz glass substrate (20×50×0.5 mm). The coating was heat treated at 400° C. for 0.5 hr to prepare sample C. The thickness of the layer in sample C was about 4 μm.

Comparative Example 3

A commercially available titania paste (nominal average particle diameter 30 nm) was coated by dipping onto a quartz glass substrate (20×50×0.5 mm). The coating was heat treated at 400° C. for 0.5 hr to prepare sample D. The thickness of the layer in sample D was about 4 μm.

Example 2

Tetraethoxytitanium $(Ti(OC_2H_5)_4)$ (1 mol) was added to 750 mL of 2-methoxyethanol. The mixture was stirred for 0.5 hr. 2-Methoxyethanol (100 mL) and 0.01 mol of acetylacetone were added thereto, and the mixture was stirred for one hr. Further, 150 mL of 2-methoxyethanol and 3 mol of water were added thereto, and the mixture was stirred for 0.5 hr to prepare a coating liquid. The coating liquid was coated by dipping onto a polycarbonate substrate (20×50×0.5 mm). The coating was subjected to microwave treatment (2.8 GHz, 1,200 W) for 15 min before drying. The coated substrate was then dipped in an ethanol solution (10 mol/L) of a ruthenium complex represented by the following formula:

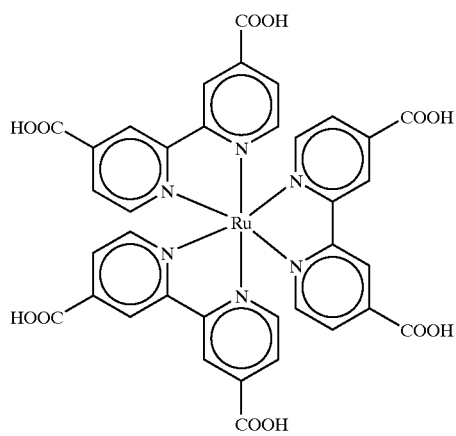

Drying was carried out at 100° C. for one hour to prepare sample E. The thickness of the layer in sample E was about 4 μm.

Example 3

Tetraethoxytitanium $(Ti(OC_2H_5)_4)$ (1 mol) was added to 750 mL of 2-methoxyethanol. The mixture was stirred for 0.5 hr. 2-Methoxyethanol (100 mL) and 0.01 mol of acetylacetone were added thereto, and the mixture was stirred for 0.5 hr. The ruthenium complex (10 mol) as used in, and represented by the formula as described in, Example 2 was added as a dye to the mixture, and the mixture was stirred for 0.5 hr. Further, 150 mL of 2-methoxyethanol and 3 mol of water were added thereto, and the mixture was stirred for 0.5 hr to prepare a dye-containing coating liquid. The coating liquid was coated by dipping onto a polycarbonate substrate (20×50×0.5 mm). The coating was exposed to ultraviolet light (high pressure mercury lamp, 400 W) before drying. The coated substrate was then heat treated at 230° C. for 10 min to prepare sample F1. The thickness of the layer in sample F1 was about 6 μm.

Example 4

Tetraethoxytitanium $(Ti(OC_2H_5)_4)$ (1 mol) was added to 750 mL of 2-methoxyethanol. The mixture was stirred for 0.5 hr. 2-Methoxyethanol (100 mL) and 0.01 mol of acetylacetone were added thereto, and the mixture was stirred for 0.5 hr. The ruthenium complex (10 mol) as used in and represented by the formula as described in Example 2 was added as a dye to the mixture, and the mixture was stirred for 0.5 hr. Further, 150 mL of 2-methoxyethanol and 3 mol of water were added thereto, and the mixture was stirred for 0.5 hr to prepare a dye-containing coating liquid. The coating liquid was coated by dipping onto a polycarbonate substrate (20×50×0.5 mm). The coated substrate was dipped in an aqueous solution (1 mol/L) of ethanol and, in this state, ultrasonic waves (25 kHz, 200 W) were applied to the coated substrate. The coated substrate was then heat treated at 230° C. for 10 min to prepare sample F2. The thickness of the layer in sample F2 was about 6 μm.

Example 5

Tetraethoxytitanium $(Ti(OC_2H_5)_4)$ (1 mol) was added to 750 mL of 2-methoxyethanol. The mixture was stirred for 0.5 hr. 2-Methoxyethanol (100 mL) and 0.01 mol of acetylacetone were added thereto, and the mixture was stirred for 0.5 hr. The ruthenium complex (10 mol) as used in and represented by the formula as described in Example 2 was added as a dye to the mixture, and the mixture was stirred for 0.5 hr. Further, 150 mL of 2-methoxyethanol and 3 mol of water were added thereto, and the mixture was stirred for 0.5 hr to prepare a dye-containing coating liquid. The coating liquid was coated by dipping onto a polycarbonate substrate (20×50×0.5 mm). The coating was subjected to microwave treatment (2.8 GHz, 1,200 W) before drying to prepare sample F3. The thickness of the layer in sample F3 was about 5 μm. The samples thus obtained were observed under an electron microscope to measure the average particle diameter of $TiO_2$ (d1), the diameter of micropores per se (d2), and the diameter of interparticulate communicating pores (d3). The results are shown in Table 1.

TABLE 1

| Sample No. | Average particle diameter of $TiO_2$ d1, nm | Diameter of micropores per se d2, nm | Diameter of interparticulate communicating pores d3, nm | Sensitizing dye |
|---|---|---|---|---|
| A | 41 | 13 | 48 | Not used |
| B | 214 | 0 | 28 | ↑ |
| C | 208 | 0 | 115 | ↑ |
| D | 57 | 0 | 74 | ↑ |
| E | 45 | 13 | 53 | Used |
| F1 | 44 | 15 | 51 | Used (coated evenly) |
| F2 | 41 | 14 | 52 | ↑ |
| F3 | 42 | 13 | 56 | ↑ |

For these samples, the scattering rate (R), the absorbance (A) and the transmittance (T) of incoming light with wavelength 300 to 650 nm were measured as properties of an oxide semiconductor electrode for a dye sensitized solar cell, and the surface area of the porous layer was measured as a measure of the area of contact between the porous layer and an electrolyte. These measurements were made with a spectrophotometer. The results are shown in Table 2 and FIGS. 6 to 13.

crystallized by the process according to the present invention, will be discussed. From the results, it is apparent that, in a short wavelength range of not more than 400 nm, all of samples F1 to F3 had scattering and absorption capabilities similar to those of sample A having a layer formed by the high-temperature heating/baking process.

TABLE 2

| Wavelength nm | Scattering rate, % | Absorbance, % | Transmittance, % | Scattering rate, % | Absorbance, % | Transmittance, % | Scattering rate, % | Absorbance, % | Transmittance, % | Scattering rate, % | Absorbance, % | Transmittance, % |
|---|---|---|---|---|---|---|---|---|---|---|---|---|
| | | | | | | Sample No. | | | | | | |
| | | A | | | B | | | C | | | D | |
| 650 | 7 | 0 | 93 | 35 | 5 | 60 | 45 | 4 | 51 | 35 | 1 | 64 |
| 600 | 8 | 0 | 92 | 30 | 3 | 67 | 44 | 4 | 52 | 30 | 3 | 67 |
| 550 | 12 | 3 | 85 | 40 | 9 | 51 | 43 | 8 | 49 | 40 | 6 | 54 |
| 500 | 17 | 5 | 78 | 42 | 12 | 46 | 38 | 15 | 47 | 42 | 5 | 53 |
| 450 | 21 | 5 | 74 | 31 | 8 | 61 | 34 | 17 | 49 | 31 | 4 | 65 |
| 400 | 15 | 14 | 71 | 29 | 14 | 57 | 32 | 15 | 53 | 29 | 12 | 59 |
| 350 | 4 | 89 | 7 | 10 | 45 | 45 | 14 | 44 | 42 | 10 | 88 | 2 |
| 300 | 0 | 92 | 8 | 12 | 40 | 48 | 13 | 38 | 49 | 12 | 82 | 6 |
| Surface area, $m^2/m^2$ | | 856 | | | 1168 | | | 194 | | | 441 | |
| | | | | | | Sample No. | | | | | | |
| | | E | | | F1 | | | F2 | | | F3 | |
| 650 | 6 | 1 | 93 | 5 | 3 | 92 | 6 | 2 | 92 | 2 | 4 | 94 |
| 600 | 8 | 20 | 72 | 5 | 24 | 71 | 8 | 21 | 71 | 4 | 18 | 78 |
| 550 | 14 | 40 | 46 | 14 | 63 | 23 | 14 | 51 | 35 | 10 | 71 | 19 |
| 500 | 18 | 62 | 20 | 17 | 74 | 9 | 18 | 75 | 7 | 15 | 82 | 3 |
| 450 | 26 | 58 | 16 | 22 | 72 | 6 | 21 | 78 | 1 | 19 | 80 | 1 |
| 400 | 20 | 50 | 30 | 18 | 65 | 17 | 20 | 68 | 12 | 11 | 72 | 17 |
| 350 | 4 | 90 | 6 | 4 | 92 | 4 | 3 | 92 | 5 | 2 | 94 | 4 |
| 300 | 0 | 97 | 3 | 0 | 96 | 4 | 0 | 98 | 2 | 0 | 99 | 1 |
| Surface area, $m^2/m^2$ | | 1261 | | | 1496 | | | 1275 | | | 1387 | |

Note) Surface area = area ($m^2$) after coating/area ($m^2$) before coating

The above results show the following facts. At the outset, the results for samples A to D, free from a sensitizing dye, will be discussed. Sample A (product of the present invention) had a scattering rate of not more than about 20% over the whole evaluation wavelength range. On the other hand, for comparative samples B and C, scattering was large particularly at 400 nm or more due to the large d1 value, and, further, the absorbance at 400 nm or less was low and not more than 50%. In particular, for sample C, because the d3 value was large and on the order of 100 nm, the level of scattering at 500 nm or more was larger than that in sample B. Further, for sample D, as the d1 value was similar to that in the sample of the present invention, the level of scattering in the short wavelength range was low and the absorbance was on a level of 90%. In a wavelength range of not less than 400 nm, however, the scattering level was larger than that in the product of the present invention. The reason for this is considered to reside in that the d3 value of sample D is larger than that of the product of the present invention and that the thickness of the titania grain boundary layer in sample D is larger than that in the product of the present invention. Further, as the percentage of the surface area of sample A relative to samples B to D was not less than 50%, solar cells using the semiconductor electrode according to the present invention is also expected to be much superior to the conventional products in power generation efficiency.

Next, the results for samples E, F1, F2, and F3, having a titania layer which contains a sensitizing dye and has been Specifically, the process according to the present invention could form an anatase phase of titania while maintaining the heating temperature at a temperature below the maximum heat-resistant temperature of the polycarbonate as the substrate.

Comparison of the results for sample E with the results for samples F1 to F3 shows that the absorbance of sample E in an absorption band of the sensitizing dye, i.e., at 400 to 550 nm, is 45 to 60%, whereas, for samples F1 to F3, a significantly improved absorbance could be provided at that absorption band, that is, the absorbance was 60 to 80%. The reason for this is considered to reside in that, in a titania coating liquid preparation process, dye molecules are added prior to the hydrolysis and dehydropolycondensation of tetraethoxytitanium and are homogeneously mixed with, and dispersed in, a molecular order in titanium molecules, the dye molecules are then placed in gaps between —(Ti—O)— bonds formed in a subsequence tetraethoxytitanium hydrolysis and dehydropolycondensation process, and an even dye layer is finally formed on the titania particles. Further, as is also apparent from the results for sample A, the transparency of the titania layer according to the present invention to a visible light region of not less than 400 nm was high and 70 to 90% or more, demonstrating that a higher absorption capability than the absorption capability in the conventional products can be provided in the absorption band of sensitizing dyes, i.e., 400 to 550 nm.

As is apparent from the foregoing description, the present invention can provide an oxide semiconductor electrode for a dye sensitized solar cell, which can realize a combination of high transparency with large surface area and is highly responsive to an ultraviolet region, as well as to a visible region, and, at the same time, can realize the use of a transparent film of an organic resin as a substrate and is flexible.

What is claimed is:

1. An oxide semiconductor electrode comprising: a conductive substrate; and an oxide semiconductor layer provided on said conductive substrate, said oxide semiconductor layer being a porous layer comprising a plurality of porous titania particles which have been joined to each other to define interparticulate communicating pores.

2. The oxide semiconductor electrode according to claim 1, wherein the pores possessed by the titania particles per se have a diameter of 10 to 40 nm.

3. The oxide semiconductor electrode according to claim 1, wherein said interparticulate communicating pores have a diameter of 10 to 70 nm.

4. The oxide semiconductor electrode according to claim 1, wherein said titania particles have an average diameter of 10 to 70 nm.

5. The oxide semiconductor electrode according to claim 1, wherein said joined titania particles bear on their surface visible region sensitizing dye molecules.

6. The oxide semiconductor electrode according to claim 5, wherein said visible region sensitizing dye molecules are molecules of a ruthenium oxide complex.

7. The oxide semiconductor electrode according to claim 1, wherein said conductive substrate is formed of a flexible material.

8. The oxide semiconductor electrode according to claim 7, wherein said flexible material is a light transparent resin film.

9. The oxide semiconductor electrode according to claim 1, wherein said oxide semiconductor layer has a thickness of 10 to 70 $\mu$m.

10. A process for producing the oxide semiconductor electrode as defined in claim 5, said process comprising the steps of: adding visible region sensitizing dye molecules to a solution of a titanium alkoxide; coating the solution with said visible region sensitizing dye molecules added thereto onto a conductive substrate; and allowing a gelling reaction to proceed in the coating to form an oxide semiconductor layer.

11. A process for producing the oxide semiconductor electrode as defined in claim 1, said process comprising the steps of: coating a solution of a titanium alkoxide onto a conductive substrate; and applying ultraviolet light, ultrasonic waves in a liquid, or a high frequency to the coating before drying of the coating to allow a gelling reaction to proceed in the coating, thereby forming an oxide semiconductor layer.

* * * * *